(12) United States Patent
Wu et al.

(10) Patent No.: US 7,257,625 B2
(45) Date of Patent: Aug. 14, 2007

(54) CACHE ON DEMAND

(75) Inventors: Tao Wu, Woburn, MA (US); Sudhir Dixit, Weston, MA (US); Sadhna Ahuja, O'Fallon, MO (US)

(73) Assignee: Nokia, Inc., Irving, TX (US)

( * ) Notice: Subject to any disclaimer, the term of this patent is extended or adjusted under 35 U.S.C. 154(b) by 887 days.

(21) Appl. No.: 10/037,297

(22) Filed: Dec. 21, 2001

(65) Prior Publication Data

US 2003/0120741 A1    Jun. 26, 2003

(51) Int. Cl.
*G06F 15/173* (2006.01)
*G06F 15/167* (2006.01)

(52) U.S. Cl. .................. 709/223; 709/213; 709/217

(58) Field of Classification Search ............... 709/219, 709/217, 238, 213, 223
See application file for complete search history.

(56) References Cited

U.S. PATENT DOCUMENTS

| | | | |
|---|---|---|---|
| 5,950,205 A * | 9/1999 | Aviani, Jr. ............. | 707/103 R |
| 6,397,267 B1 * | 5/2002 | Chong, Jr. ............. | 710/1 |
| 6,578,073 B1 * | 6/2003 | Starnes et al. ............. | 709/219 |
| 6,578,113 B2 * | 6/2003 | Krishnamurthy et al. ... | 711/141 |
| 6,704,781 B1 * | 3/2004 | Einarson et al. ............ | 709/223 |
| 6,832,252 B1 * | 12/2004 | Cieslak et al. ............. | 709/225 |

OTHER PUBLICATIONS

International Search Report from International PCT Application No. PCT/IB02/05485.

* cited by examiner

*Primary Examiner*—Ario Etienne
*Assistant Examiner*—Hussein El-chanti
(74) *Attorney, Agent, or Firm*—Banner & Witcoff, Ltd.

(57) ABSTRACT

Methods and systems are provided for delivering content from a website to a computer device. The website and computer device negotiate terms for use of a cache memory coupled to the computer device. The computer device requests content, such as web page objects, from the website. In addition to transmitting the requested content, the website transmits non-requested content to the computer device. The non-requested content is stored in the cache memory for later retrieval by the computer device.

20 Claims, 4 Drawing Sheets

CACHE ON DEMAND

BACKGROUND OF THE INVENTION

1. Field of the Invention

The invention relates to the transmission of data in a computer network. More particularly, the invention relates to systems and methods for negotiating over the use of a cache memory that stores content received from a computer device.

2. Description of related Art

The performance of a computer network can become degraded as more computers are connected to the network. It is common for a group of computers to be connected to a local area network (LAN), and for the LAN to include an access router coupling the LAN to a wide area network (WAN), such as the Internet. The computers connected to the LAN request content from sites connected to the Internet through the access router. Modem Internet websites increasingly use objects that have large memory requirements and/or require large bandwidths for transmission to remote computers. As a result, many times users experience delays while navigating between pages of a website. Latency delays can adversely impact a user's experience and often result in users visiting alternative websites to purchase similar goods and services.

One proposed solution involves storing content in a cache memory coupled to the access router. The cache memory is configured to store all received content until the memory is full. When the memory is full, the oldest content is deleted. Such systems reduce latency, but fail to optimize the use of cache memories. As a result, the performance of cache memories becomes degraded or designers use larger cache memories than would otherwise be required.

As a result, there exists a need in the art for more optimal systems and methods for transmitting content from computer devices to remote computer devices while minimizing the latency delays apparent to the user. There also exists a need for methods and systems that allow users, Internet service providers and computer devices to customize the latency in the delivery of content from a first computer site to a second computer site.

BRIEF SUMMARY OF THE INVENTION

The above-mentioned needs in the art are satisfied by systems and methods that allow computer devices to negotiate over the use of a cache memory. Advantages to allowing the computer devices to negotiate over the use of the cache memory include allowing designers to optimize the size of the cache memory, allowing Internet service providers and other entities controlling access routers to provide premium content delivery options and providing better service to end users.

A first embodiment of the invention provides a method of transmitting requests and content at a cache computer. A first computer device and a second computer device are coupled to the cache computer and the first computer device requests content from the second computer device. The method includes receiving a cache request from the second computer device and receiving at the cache computer non-requested content from the second computer device. The non-requested content is content other than content requested by the first computer device.

Another embodiment of the invention provides a method of transmitting content from a first computer device to a second computer device, wherein the first computer device and the second computer device are coupled to a cache computer device. The method includes receiving from the cache computer device, a request for content. The requested content and a request for use of a cache memory are transmitted to the cache computer device. After accepting terms for the use of the cache memory, non-requested content is transmitted to the cache computer device, wherein the non-requested is content other than content requested by the cache computer device.

In other embodiments of the invention, computer-executable instructions for implementing the disclosed methods are stored on computer-readable media, such as magnetic or optical disks.

In still other embodiments of the invention, computer devices are provided. The computer devices include memories containing computer-executable instructions for causing the computer devices to perform the disclosed methods.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
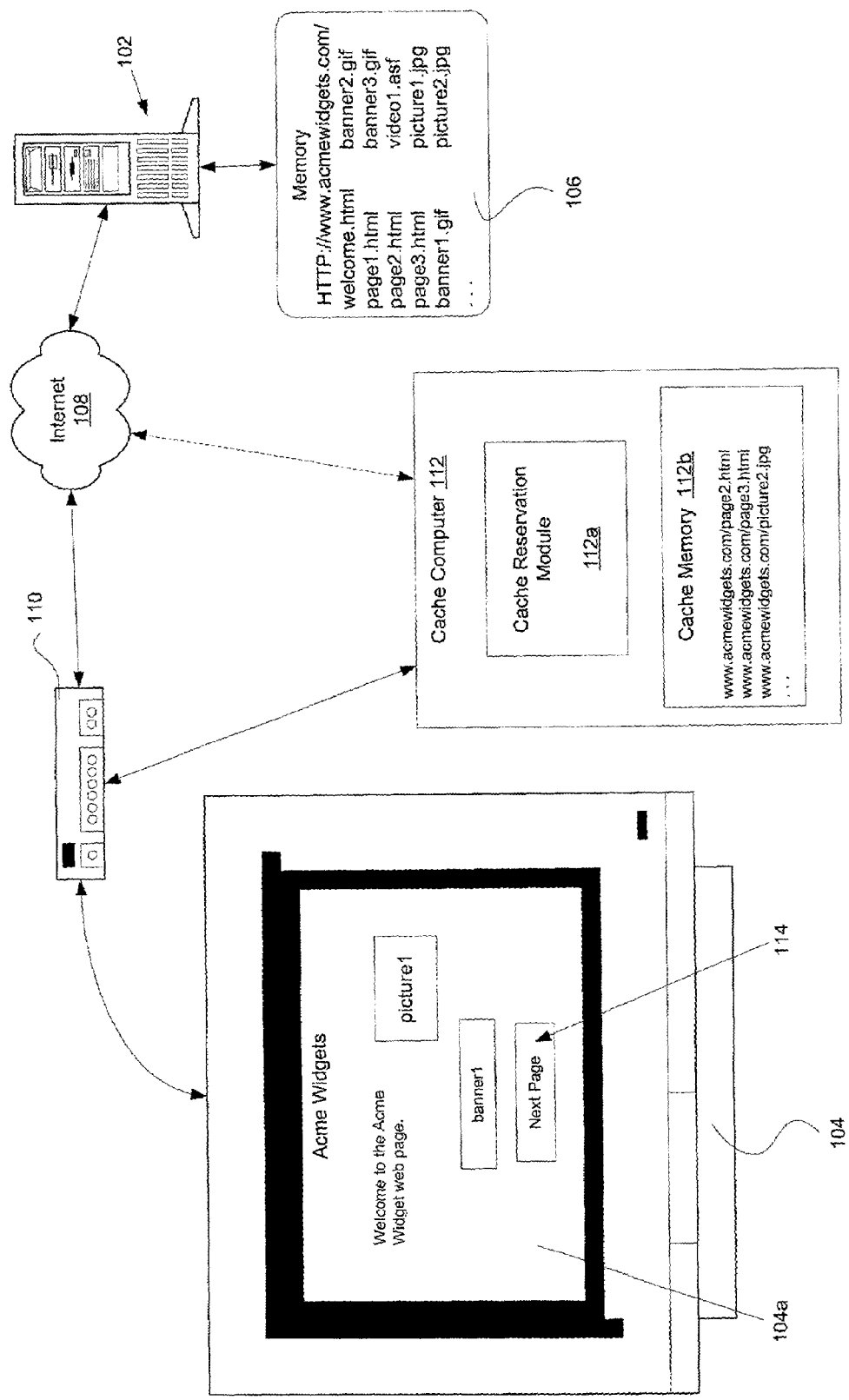
FIG. 1 illustrates a system for transmitting data that includes a cache computer, in accordance with an embodiment of the invention.

FIG. 1 illustrates an embodiment of the invention in which a website 102 transmits objects to a local computer 104. Local computer 104 may be implemented with a workstation, personal digital assistant, mobile terminal or other computer device. Website 102 is coupled to a memory 106, which contains the objects. The objects may include HTML computer code, streaming video files, image files, multimedia files, or any other objects that may be exchanged between computer devices. The objects in memory 106 may be transmitted to local computer 104 via the Internet 108 and an access router 110. Of course, the present invention is not limited to use with the Internet. In alternative embodiments, other computer networks may be utilized. Furthermore, website 102 may be replaced with a wireless application protocol (WAP) site, client computer or other computer device. Access router 110 may be coupled to a cache computer device 112. Cache computer device 112 may include a cache reservation module 110a for allocating cache memory space or resources in the manner described below. Cache computer device may also be coupled to or include a cache memory 112b for storing objects or be coupled to the Internet 108 instead of access router 110. In an alternative embodiment, the components of cache computer device 112 may be implemented within access router 110.

Local computer 104 may include computer-executable instructions for assembling objects to create a web page 104a. With conventional systems, when a user requests additional content, such as by selecting a next page button 114, local computer 104 sends a request through access router 110 and Internet 108 to website 102 to retrieve additional content. The user typically then waits for website 102 to retrieve the requested content and transmit the content to local computer 104.

The present invention reduces the latency apparent to a user by storing copies of objects found in memory 106 in cache memory 112b. Website 102 and either access router 110, local computer 104 or cache computer device 112 agree upon terms for storing content in a cache memory 112b. Cache memory 112b may be implemented with a magnetic, optical, electrical or other memory device and may allocate memory sections to different entities for predetermined periods of time. All requests from local computer 104 for content from website 102 may first be received at cache computer device 112. If the requested content is stored in cache memory 112b, the content is transmitted from cache computer device 112 to local computer 104. If the requested content is not stored in cache memory 112b, cache computer device 112 may first request the content from web site 102 and then transmit the content to local computer 104. Cache computer device 112 may act as both a client and a server.

An example will now be described to illustrate how the system shown in FIG. 1 may operate. While a user is viewing web page 104a on local computer 104, cache computer device 112 and website 102 may negotiate for the use of cache memory 112a. Cache computer device 112 may then retrieve additional content from memory 106 and store the content in cache memory 112a. Cache computer device 112, local computer 104 and access router 110 are typically part of an access network, such as a LAN. However, as shown by path 114, cache computer device 112 may be coupled to access router 110 via a wide area network, such as the Internet 108. When a user selects next page button 114, the content for the next web page may be retrieved from cache memory 112a and not from memory 106. When cache server 112 is part of the same access network as access router 110 and local computer 104, the time in which it takes local computer 104 to retrieve content stored in cache memory 112a be substantially less than the time it takes to retrieve similar content from website 102 connected to the Internet 108.

Figure 2:
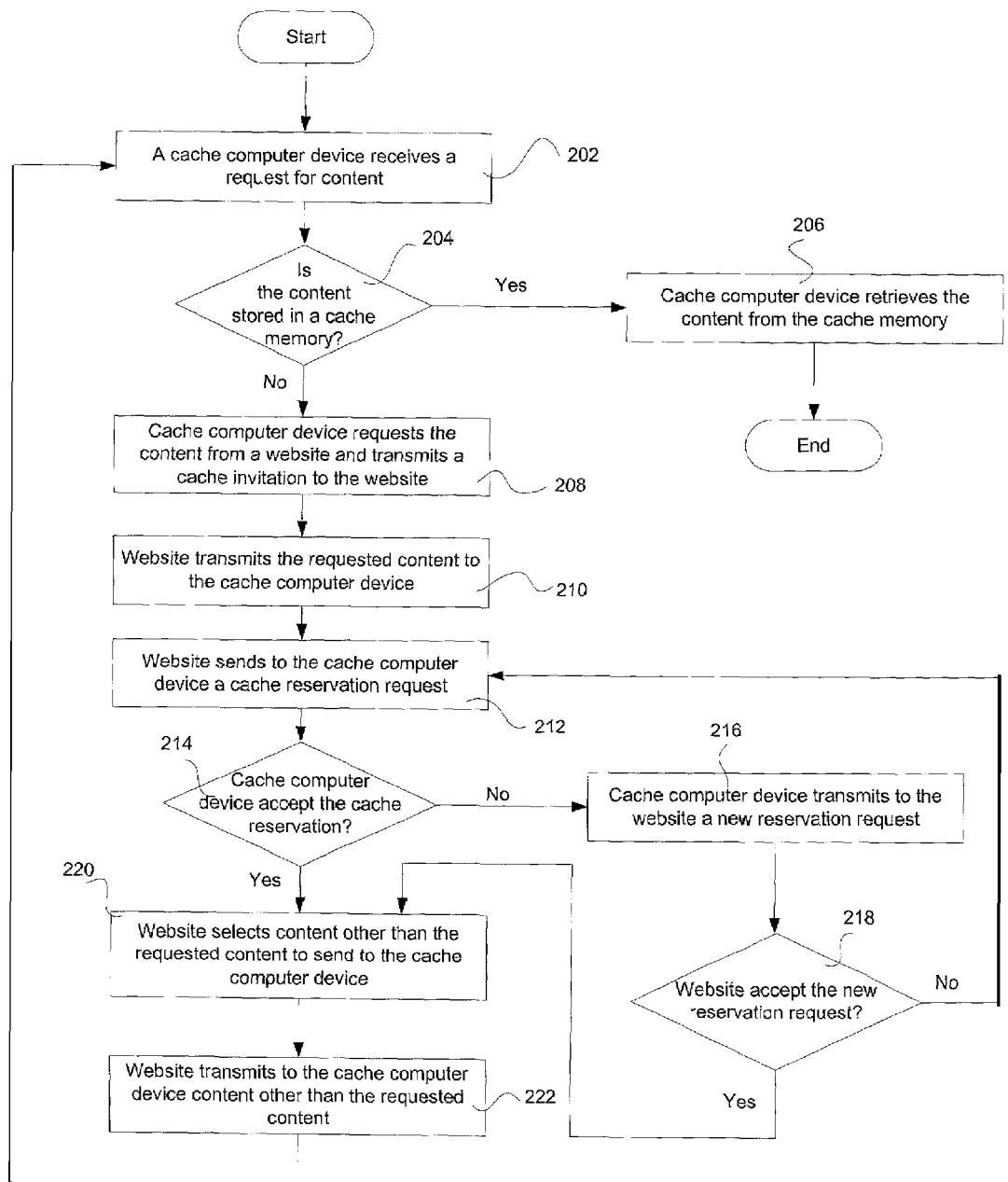
FIG. 2 illustrates a method of transmitting content from a website to a cache computer device, in accordance with an embodiment of the invention.

FIG. 2 illustrates a method of transmitting content from a website to a cache computer device, in accordance with an embodiment of the invention. The cache computer device may comprise server computer, access router or another computer device coupled to a local computer. First, in step 202 the cache computer device receives a request for content from a local computer. In one embodiment, step 202 includes an access router receiving a request for Internet content from a workstation coupled to the access router via an access network. Next, in step 204 it is determined whether or not the requested content is stored in a cache memory. The cache memory may be included with the cache computer (as shown in FIG. 1). When the content is stored in a cache memory, in step 206 the cache computer device retrieves the content from the cache memory. When the content is not stored in the cache memory, in step 208 the cache computer device transmits a request for the content and a cache invitation to a website containing the requested content. Step 208 may include an access router or cache computer device requesting content from an Internet website in a conventional manner. The cache invitation may alert the web site that the requesting computer offers a cache on demand service. In one embodiment of the invention, the cache invitation is found in a header of the request for content. As stated above, the present invention is not limited to embodiments that involve requesting content from websites. In embodiments in which cache invitations are sent to client computers, the cache reservations may also be found in headers of requests for content.

In step 210, the website transmits the requested content to the cache computer device. Next, in step 212 the website sends the cache computer device a cache reservation request. In one embodiment of the invention, the cache reservation request includes a starting time for use of the cache, an ending time, an amount of storage space needed and a proposed fee for use of the cache memory. In alternative embodiments, the cache reservation request may include multiple sets of parameters, with a separate proposed fee for each set. For example, a first set may request 20 MB of memory for 10 minutes with a fee of $4.00 and a second set may request 25 MB of memory for 30 minutes with a proposed of $6.00. The sets of parameters may be arranged in an order, such as one that corresponds to the preferences of the website. In one embodiment of the invention, the cache reservation request comprises an identification of the website. The identification may be compared to a list of websites that have previously negotiated cache reservation terms. One skilled in the art will appreciate that the present invention is not limited to embodiments that involve the allocation of memory space. The present invention also encompasses embodiments that include the allocation of other parameters that impact quality of service, such embodiments that allocate bandwidth, allocate CPU time or prioritize packet or frame processing.

In step 214 the cache computer device either accepts or denies the cache reservation request. In embodiments that include multiple sets of parameters within a cache reservation request, the cache computer device may accept one of the sets or deny all of the sets. The decision may be based on factors such as: the amount of free space available in the cache memory, commitments to other websites, the proposed fee or other factors. When the cache computer device denies the cache reservation request, in step 216, the cache computer device may transmit a new cache reservation request to the website. The new reservation request may include additional or alternative terms. For example, if the cache computer device does not have enough free memory to satisfy the original cache reservation request, the new cache reservation request may propose allocating a smaller amount of memory. Next, in step 218 the website either accepts or denies the new cache reservation request. When the website denies the new reservation request, the website may again transmit a new reservation request to the cache computer device in step 212.

The negotiation process that includes steps 212, 214, 216 and 218 may be repeated any number of times until an agreement is reached. Alternatively, the negotiations that take place between the website and the cache computer device may be limited. For example, the process may be aborted after a predetermined number of cache reservation requests have been denied. The process may also be aborted after the negotiation process has consumed a predetermined length of time.

When the website and the cache computer device agree on the terms of a cache reservation, in step 220, the website may select content, other than the requested content, to send to the cache computer device. The non-requested content selected by the website may include content that typically takes a long time to transmit from a website to a computer device, such as: a streaming video, a wave file or a high-resolution image file. The website may make the selection based on a variety of different factors, such as predicting the content that the website believes that the computer device will select next. For example, if the computer device requested content for a particular web page, the website may select objects used to create the next web page. Finally, in step 222 the website transmits the non-requested content to the cache computer device. Step 222 may include transmitting address information and allowing the cache computer device to retrieve the content.

The next time the computer device receives a request for content (in step 202), the content may be stored in cache memory 112b. As stated above, retrieving content from a cache memory is generally much faster than retrieving the same content from a website via a wide area network, such as the Internet. As a result, the quality of service provided to an end user is improved.

Figure 3:
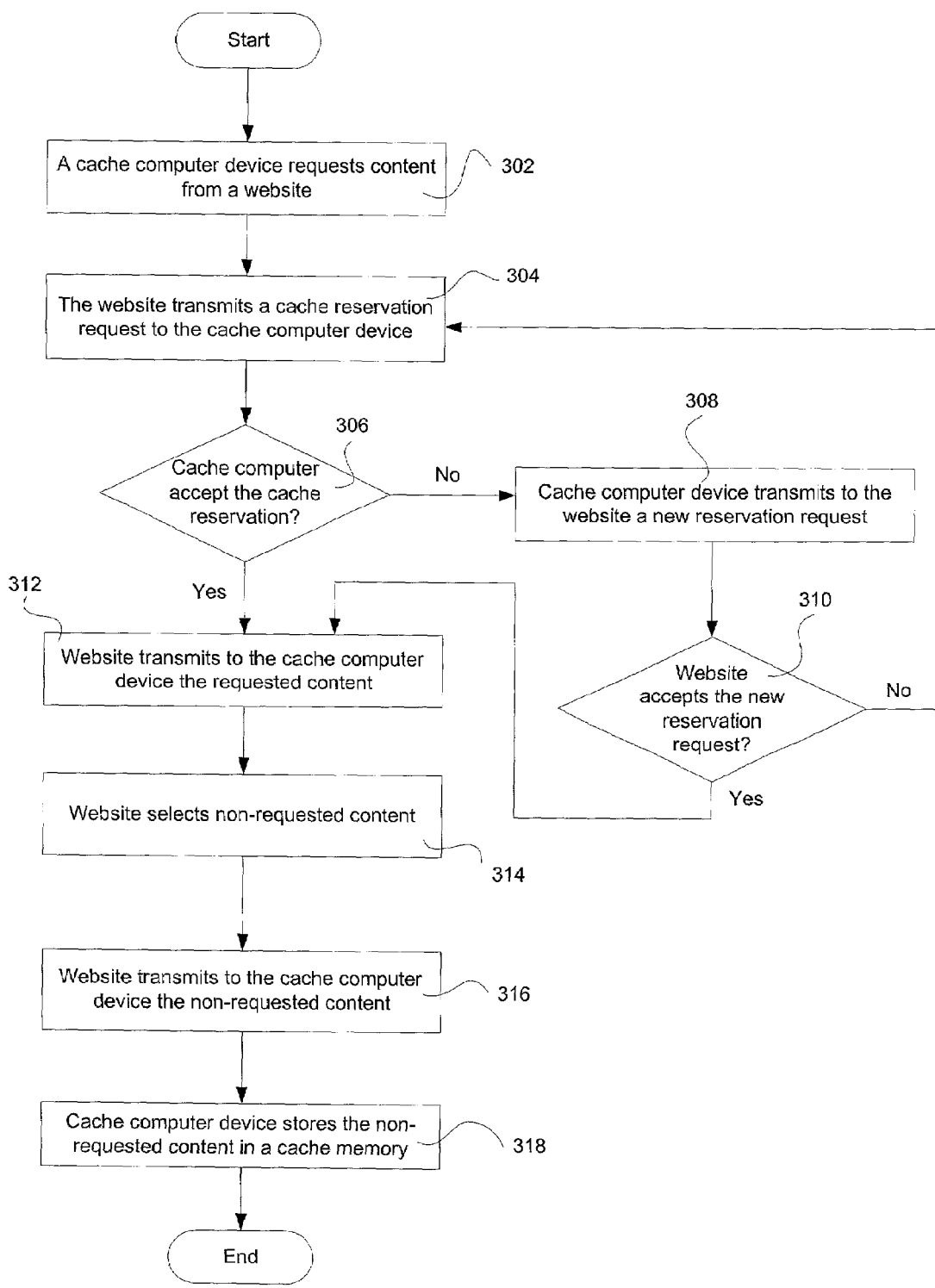
FIG. 3 illustrates an embodiment in which a website initiates a cache reservation request.

FIG. 3 illustrates an embodiment in which a website initiates a cache reservation request. First, in an optional step 302, the cache computer device requests content from a website. In alternative embodiments, step 302 may be eliminated when a website or other computer knows that the cache computer offers a cache on demand service. As stated above the cache computer device may comprise an access router and the website may comprise an Internet website. Next, in step 304, the website transmits a cache reservation request to the cache computer device. Various implementations of cache reservation requests have been described above. In step 306, the cache computer device determines whether or not to accept the cache reservation. When the cache computer does not accept the cache reservation request, in step 308, the cache computer may transmit, to the website, a new reservation request. Then, in step 310, it is determined whether or not the website accepts the new reservation request. When the website does not accept the new reservation request, the process may return to step 304 to continue the negotiation process. In an alternative embodiment, after not accepting a cache reservation request in step 306, the cache computer device may transmit a denial to the website and the website may transmit a new cache reservation request to the cache computer device in step 304. As described above, in some embodiments of the invention, the negotiation process may be limited.

In step 312 the website transmits to the computer device the requested content. The requested content may include objects for creating an Internet web page. One skilled in the art will appreciate that at least some of the disclosed methods may be practiced in orders other than the orders described and shown. For example, in one alternative embodiment, step 312 may be performed immediately after step 302 so that the transmission of the requested content is performed before and is independent of the cache reservation negotiation process. In step 314 the website selects non-requested content. Step 314 may be similar to step 220 (shown in FIG. 2). The website may transmit the non-requested content to the cache computer device in step 316, and the cache computer device may store the non-requested content in a cache memory for later retrieval in step 318.

In several embodiments of the invention, websites monitor the content stored in cache computers. For example, website 102 (shown in FIG. 1) may include a memory module storing the identification of content transmitted to cache memory 112b. Website 102 may use this information to update the content stored in cache memory 112b to provide a system with strong consistency.

Figure 4:
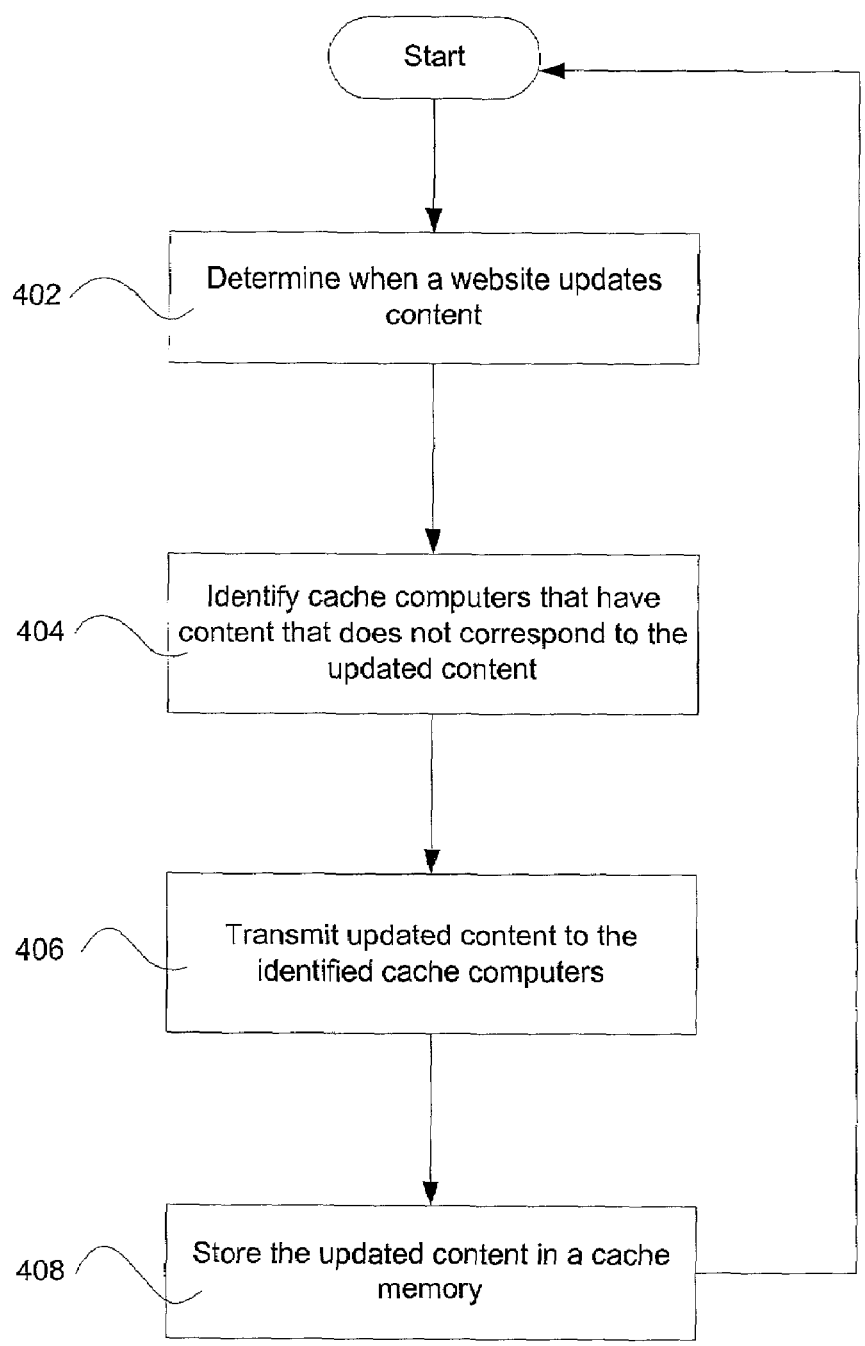
FIG. 4 shows a method of updating content stored in a cache memory, in accordance with an embodiment of the invention.

FIG. 4 illustrates a method of updating content stored in a cache computer in accordance with an embodiment of the invention. First, in step 402 it is determined when a website updates content. Step 402 may include determining when a Webmaster has updated content available on an Internet website. Step 402 may include identifying new objects and identifying when existing objects have been modified. Next, in step 404 a website or other entity may identify cache computers that contain content that does not correspond to the updated content. For example, website 102 may include a memory (not shown) containing a list of the objects stored in cache memory 112b. Moreover, when an object stored in memory 106 is updated, website 102 may determine if cache memory 112b contains a previous version of that object.

In step 406, the updated or new content is transmitted to a cache computer. Finally, in step 408 the updated or new content is stored in the cache memory.

The reservation requests described above may include terms relating to the updating of content. For example, a computer device may request an additional fee when content is replaced or updated after the additional transmission.

While the invention has been described with respect to specific examples, those skilled in the art will appreciate that there are numerous variations and permutations of the above described systems and techniques that fall within the spirit and scope of the invention as set forth in the appended claims. For example, cache memory 112a may be divided into two sections. A first section may operate in a conventional manner and a second section may allow computer devices to reserve cache memory space, as described above. Moreover, a computer other than the cache computer or website my request the use of cache memory space. For example, a local computer device may obtain access to the Internet through an Internet service provider (ISP) that desires to offer a premium cache on demand service to end users of local computer devices. A user of a local computer may request the cache on demand service.

We claim:

1. A method comprising the steps of:
   (a) receiving a request from a first computer device requesting content to be transmitted from a second computer device to the first device;
   (b) receiving from the second computer device a prediction of non-requested content that the first computer device will request based on the content requested by the first device;
   (c) receiving, at a cache computer, a first cache request from the second computer device to cache the non-requested content on the cache computer wherein the first cache request includes an amount of memory requested to cache the non-requested content;
   (d) determining an amount of free space available on the cache computer wherein:
   (e) if the amount of free space available is more than the requested amount of memory to cache the non-requested content, caching the non-requested content is cached at the cache computer, and
   (f) if the amount of free space is less than the requested amount of memory to cache the non-requested content, transmitting a second cache request to the second computer device wherein the second cache request includes an amount of memory available to the second computer device.

2. The method of claim 1, further including (c) transmitting a cache invitation to the second computer device.

3. The method of claim 2, wherein the cache invitation is located within a header oft request for content.

4. The method of claim 1, wherein the cache request includes terms that have previously been agreed upon by the cache server and the second computer device.

5. The method of claim 1, wherein the cache request comprise a fee for use of the cache memory space.

6. The method of claim 5, wherein the fee is paid by the second computer device.

7. The method of claim 1, wherein the non-requested content comprises objects of a web page.

8. The method of claim 1, further including:

(g) receiving at the cache computer the identification of non-requested content.

9. The method of claim 8, wherein the identification of non-requested content comprises memory addresses of non-requested content.

10. The method of claim 8, in response to (g) further including:

(g) requesting the non-requested content from the second computer.

11. A method of transmitting content from a first computer device, the method comprising:

(a) receiving a request for content from a cache computer device at the first computer device;

(b) transmitting to the cache computer device the requested content;

(c) receiving from the second computer device prediction of non-requested content that the first computer device will request based on the content requested by the first device;

(d) transmitting to the cache computer device a cache request from the second computer device to cache the non-requested content on the cache computer wherein the cache request includes terms comprising an amount of cache memory requested to cache the non-requested content;

(e) determining an amount of free space available on the cache computer wherein:

(f) after accepting terms for the use of the cache memory, transmitting to the cache computer device the non-requested content, wherein the non-requested is content other than content requested by the cache computer device; wherein if the terms are not accepted, the second computer device is configured to receive a denial in response to the request for the use of the cache memo and the second computer device receives an amount of memory available to the second computer device.

12. The method of claim 11, wherein the cache computer device comprises an access muter coupled to an access network.

13. The method of claim 11, wherein the request in (c) comprises a proposed fee for use of the cache memory.

14. The method of claim 11, further including the steps of:

(e) determining when the first computer device updates the non-requested content; and (f) transmitting updated non-requested content to the second computer deviCe when the first computer device updates the non-requested content.

15. The method of claim 11, wherein the request in step (c) comprises a time duration.

16. The method of claim 11, wherein the request in step (c) comprises a proposed fee.

17. The method of claim 11, further including the steps of:

(e) transmitting to the first computer device an approval of the proposed terms for use of the cache memory.

18. The method of claim 11, wherein the cache request of (c) is located within a header of the requested content.

19. A computer-readable medium containing computer-executable instructions that when executed perform the steps comprising:

(a) allowing a request from a first computer device requesting content to be transmitted from a second computer device to the first computer device;

(b) receiving from the second computer device, a prediction of non-requested content that the first computer device will request based on the content requested by the first computer device;

(c) receiving at a cache computer, a first cache request from the second computer device to cache the non-requested content on the cache computer wherein the first cache request includes an amount of memory requested to cache the non-requested content:

(d) determining an amount of free space available on the cache computer;

(e) if the amount of free space available is more than the requested amount of memory to cache the non-requested content, caching the non-requested content at the cache computer, and f) if the amount of free space is less than the requested amount of memory to cache the non-requested content, transmitting a second cache request to the second computer device wherein the second cache request includes an amount of memory available to the second computer device.

20. An access muter coupled to a local computer and a website, the access router including a cache module configured to perform the steps comprising:

(a) receiving a cache request from the website; and (b) receiving non-requested content from the website, wherein the non-requested is content other than content requested by the local computer.

* * * * *

UNITED STATES PATENT AND TRADEMARK OFFICE
CERTIFICATE OF CORRECTION

| | | |
|---|---|---|
| PATENT NO. | : 7,257,625 B2 | Page 1 of 1 |
| APPLICATION NO. | : 10/037297 | |
| DATED | : August 14, 2007 | |
| INVENTOR(S) | : Tao Wu et al. | |

It is certified that error appears in the above-identified patent and that said Letters Patent is hereby corrected as shown below:

In Column 7, Claim 3, Line 8:
    Please replace "oft" with --of a --

In Column 7, Claim 11, Line 34:
    Please replace "device" with --device a--

In Column 7, Claim 11, Line 53:
    Please replace "memo" with --memory--

In Column 7, Claim 12, Line 57:
    Please replace "muter" with --router--

In Column 8, Claim 14, Line 8:
    Please replace "deviCe" with --device--

In Column 8, Claim 20, Line 49:
    Please replace "muter" with --router--

Signed and Sealed this

Twenty-ninth Day of July, 2008

JON W. DUDAS
*Director of the United States Patent and Trademark Office*